(12) United States Patent
Daniel

(10) Patent No.: US 6,837,147 B2
(45) Date of Patent: Jan. 4, 2005

(54) NO-SOLIDS-BUILD-UP TANK

(75) Inventor: Aaron Daniel, Caldwell, ID (US)

(73) Assignee: Rule Steel, an Idaho Corporation, Caldwell, OH (US)

(*) Notice: Subject to any disclaimer, the term of this patent is extended or adjusted under 35 U.S.C. 154(b) by 19 days.

(21) Appl. No.: 10/179,580

(22) Filed: Jun. 24, 2002

(65) Prior Publication Data

US 2003/0233945 A1 Dec. 25, 2003

(51) Int. Cl.[7] .............................................. C12G 1/02
(52) U.S. Cl. ..................... 99/277.1; 99/276; 99/217; 29/422; 29/425; 413/1
(58) Field of Search ...................... 99/277.1, 277.2, 99/277, 276, 278; 413/1; 29/422, 425

(56) References Cited

U.S. PATENT DOCUMENTS

| | | |
|---|---|---|
| 159,450 A | 2/1875 | Reford |
| 291,535 A | 1/1884 | Rall |
| 755,144 A | 3/1904 | Lapp |
| 954,889 A | 4/1910 | Schneible |
| 2,536,994 A | 1/1951 | Cremaschi |
| 3,100,052 A | 8/1963 | Brembeck ............... 214/17 |
| 3,729,321 A | 4/1973 | Vacano |
| 3,823,655 A | 7/1974 | Potter ................. 99/277 |
| 3,910,173 A * | 10/1975 | Zepponi ................. 99/277.1 |
| 4,164,902 A | 8/1979 | Maarleveld ............. 99/277.1 |
| 4,441,407 A | 4/1984 | Rieger ................... 99/277.2 |
| 4,474,890 A | 10/1984 | Rieger ................... 435/316 |
| 4,593,612 A * | 6/1986 | Rieger ................... 99/277.2 |
| 4,665,807 A | 5/1987 | Rieger ................... 99/277.1 |
| 4,969,391 A | 11/1990 | Haulot .................. 99/277.1 |
| 5,356,048 A | 10/1994 | Geiser ................... 222/185 |
| 6,279,457 B1 * | 8/2001 | Francia ................. 99/277.1 |
| 2001/0042760 A1 | 11/2001 | Krol .................... 222/185.1 |

* cited by examiner

Primary Examiner—Reginald L. Alexander

(57) ABSTRACT

This invention is a self-emptying tank for processing fluids having included solids, such as stainless steel tanks in wineries. The tank has a shell section having a lower end that is fixedly joined to the top perimeter of the tank's bottom section, at a non-horizontal junction. Preferably, the shell section is nominally a right circular vertical cylinder having front and back faces, the front face being vertically longer than the back face, which increases the cylindrically-shaped area available at the front of the tank for instruments and other ancillary devices. The formed junction between the shell section and the bottom section slopes downward from the back face to the front face of the shell section. At the bottom front of the bottom section of the tank is an outlet portion surrounding an outlet aperture, which provide a vertical, or close to vertical outlet from the tank that is preferably on the same or close to the same vertical plane with the front face of the tank.

12 Claims, 4 Drawing Sheets

NO-SOLIDS-BUILD-UP TANK

BACKGROUND OF THE INVENTION

1. Field of the Invention

This invention relates to tanks for storing and processing food stuffs, and more particularly to a novel self-emptying tank for storing and processing grapes and their fermentation products.

2. Related Art

A primary objective in the design of storage and processing tanks, particularly those used in the fermentation of wine, include the complete emptying of the tank. This is easily achieved, of course, with low viscosity fluids. However, should the tank contain solids, such as the residue of grape skins and pulp, the achievement of a fully self-draining tank is far more difficult. In addition, current applications for self-emptying tanks require the tank's drain opening to be as close to vertical as practical. A vertical orientation of the drain opening facilitates the control of the discharge process and concentrates any remaining drainage and drippings over a smaller area.

As will be demonstrated in the following review, the known prior art has failed to effectively and economically achieve these highly desired objectives.

The prior art is replete with myriad forms of tanks proposed to facilitate their emptying or draining. Most of these tanks have a vertically-oriented cylindrical upper section and a conical bottom section, the axes of the two sections being co-linear. Examples of such tanks that also include a substantially horizontal exit opening, vice the desired vertical exit opening, date back to 1875, i.e. Reford (U.S. Pat. No. 159,450). Other examples include Rall (U.S. Pat. No. 291,535), Lapp (U.S. Pat. No. 755,144), Schneible (U.S. Pat. No. 954,889), Cremaschi (U.S. Pat. No. 2,536,994), Potter (U.S. Pat. No. 3,823,655) and Maarleveld (U.S. Pat. No. 4,164,902).

Others have addressed the goal of a vertically-oriented exit opening in combination with a vertical upper cylindrical section and a conical bottom section. For example, Brembeck (U.S. Pat. No. 3,100,052) discloses a bulk feed bin having an angled and adjustable exit opening, but does not provide for a fully-vertical opening. Rieger (U.S. Pat. No. 4,593,612) incorporates a horizontal auger in the bottom of the lower conical section to extract the tank's contents. Reiger's arrangement leaves many crevices and corners for solids to accumulate.

Zepponi (U.S. Pat. No. 3,910,173) teaches a tank having an vertically-oriented right circular cylindrical upper section mated with a conical lower section along a horizontal diameter of the cylinder. The uniqueness in Zepponi is that the axis of the conical section is angled with respect to the axis of the cylindrical section such that a portion of the wall of the conical section is in vertical alignment with the wall of the cylindrical section. In addition, the angle of the cone's axis and the dimensions of the cone provide wall angles that are at least as steep as the angle of repose of the tank's contents. An exit opening is provided by an angled cut across the cone near its vertex. If this cut is made perpendicular to the axis to the cone, the opening will be circular but at an angle substantially deviating from the vertical. If the cut is made at an angle to the cone's axis, the opening will be extremely elliptical, and still substantially non-vertical. Because of the vertical orientation of a portion of the cone's wall, any cutting of the cone by an angled cut across the cone near its vertex will produce a substantially horizontal exit opening and not produce a fully-vertical exit opening.

In addition, the horizontal intersection between Zepponi's cylindrical upper section and his conical lower section reduces the amount of front surface area of the tank available for the installation of ancillary devices such as temperature probes and sample taps.

Therefore, there is a need for an improved process tank for liquids such as wine that contain substantial amounts of solids at times during the process. It is a primary objective of the invention herein disclosed to provide a self-emptying tank that presents a fully-vertical outlet or drain opening. It is another objective to provide a tank that inhibits the retention of solid residues subsequent to drainage of the tank. It is yet another objective to provide a tank that can accommodate any desired drainage opening angle and shape and still offer effective residue elimination results. It is still another objective of this invention to provide a self-emptying tank that continues its cylindrical shape downwardly as close as practical to the outlet opening. It is another objective of this invention to minimize the stress in the intersections between the components forming the tank. It is a final objective to provide a tank that is inexpensively fabricated.

SUMMARY OF THE INVENTION

This invention is a self-emptying tank for processing fluids having included solids. The tank features a generally vertical bottom exit opening and a long vertical front face for convenient placement of accessories at an easily-reached level above the ground/floor.

The tank has a top section, a shell section having upper and lower ends, and a bottom section having an outlet portion and an upper portion. The upper end of the shell section is fixedly joined to the perimeter of the top section. The lower end of the shell has a formed shape and is cooperatively joined to the matching shape of the upper portion of the bottom section. In the preferred embodiment, the shell section is nominally a right circular vertical cylinder having front and back faces, the front face being vertically longer than the back face. Thus, the formed intersection between the shell section and the bottom section slopes downward from the back face to the front face of the shell section.

Also, in the preferred embodiment, the outlet aperture in the bottom section is generally vertical, and the outlet portion of the bottom section that surrounds and/or defines the outlet aperture, is aligned with the front face of the shell section, so that the bottom outlet of the tank may be said to be generally vertical and at or very near the front extremity of the tank. The orientation of the outlet portion is preferably vertical, or an angle close to vertical, such as preferably within 20 degrees of vertical, or, more preferably, within 15 degrees of vertical.

Another important benefit of the non-conical, formed intersection approach to tank design is that the outlet aperture/outlet portion may be any shape that facilitates the discharge of the tank's contents, as the outlet aperture is defined, not by a cut through a cone, but rather by the curve cut in the plate(s) of material that is(are) used to form the bottom portion of the tank. The most desirable shape is circular, but also there is expected to be a demand for rectangular, square and oval outlet shapes. Rectangular and square shapes are especially desirable for larger tanks (6000 gallons and greater) to facilitate the discharge of the greater volume and to accommodate the types of valve closures preferred in such operations.

There is an additional beneficial consequence to the formed intersection concept resulting from the extended front face of the shell section. This extended front face provides critical, additional low-curvature surface area which is immediately above the outlet to accommodate ancillary devices such as temperature probes, sample taps, inspection ports, and so forth. This extended front face is vertical and generally low to the ground/floor, for each access by operators of the process.

These and many other features and attendant advantages of the invention will become apparent as the invention becomes better understood by reference to the following detailed descriptions and accompanying drawings.

DESCRIPTION OF THE PREFERRED EMBODIMENTS

Referring to the Figures, there are shown several, but not the only, embodiments of the invented "self-emptying" or "no-solids-build-up" tank. The design of the invented tank is particularly well-adapted to complete emptying of the tank, and to convenient use and access to the bottom outlet portion of the tank and to the elongated front face of the cylindrical shell of the tank.

Figure 1:
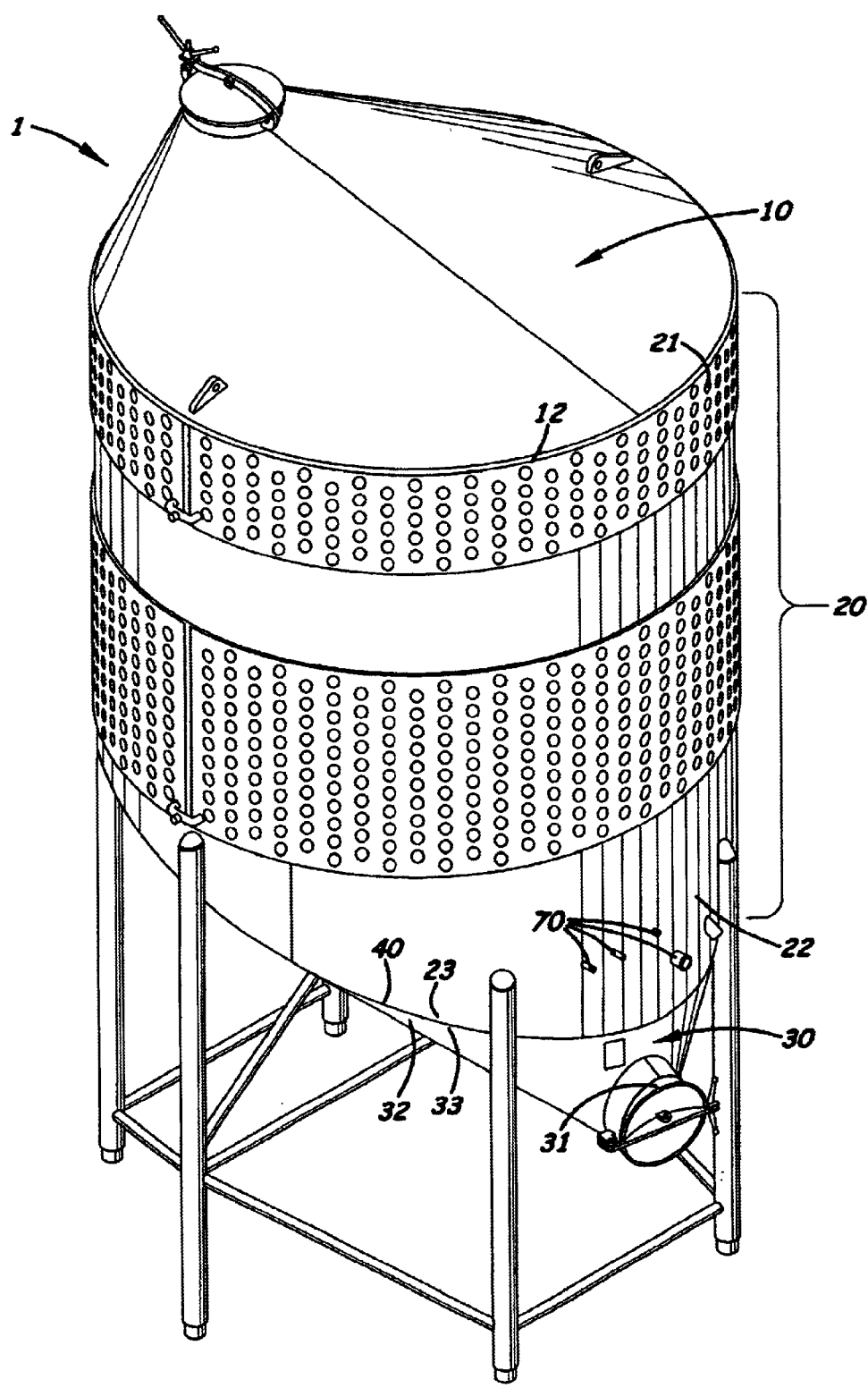
FIG. 1 is an isometric view of one embodiment of the no-solids-build-up tank of this invention.

As depicted in FIG. 1, this invention is a self-emptying tank 1 for processing fluids that include solids. Tank 1 comprises top section 10 having a perimeter 12, shell section 20 having upper and lower ends 21, 22, with the upper end being fixedly joined to perimeter 12 of top section 10. Lower end 22 of the shell section has a first formed edge or "first formed shape" 23. Bottom section 30 has outlet portion 31 and upper portion 32. The upper portion has second formed edge or "second formed shape" 33, which is fixedly and cooperatively joined to the first formed shape 23 of the lower end of the shell section. In this manner, formed intersection 40 is established between the shell section and the bottom section. The joining of the above described sections is preferably accomplished by welding.

Figure 2:
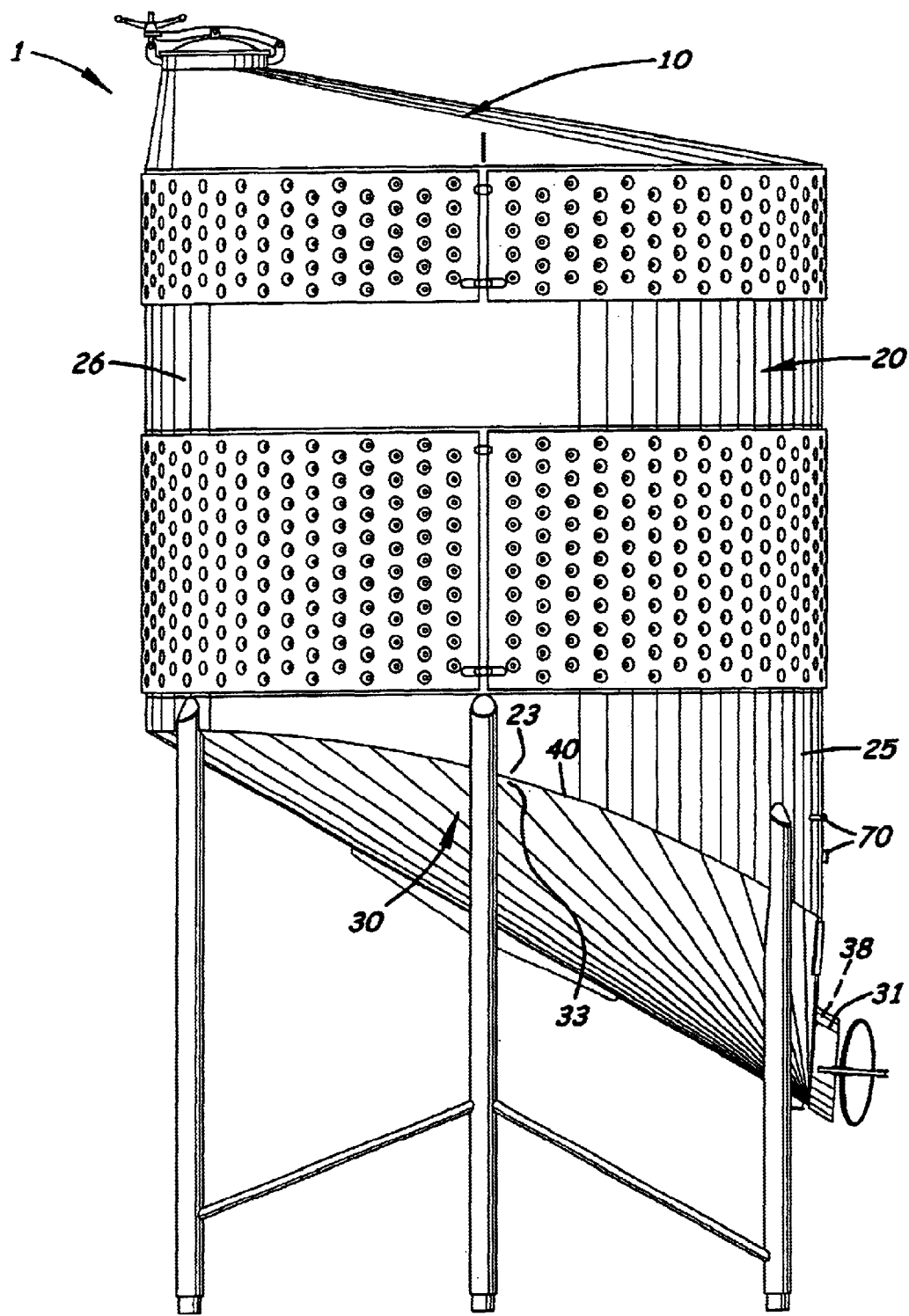
FIG. 2 is a left side view of the embodiment of FIG. 1, showing the verticality of the tank's outlet portion and the extended vertical front face of the tank shell.

Referring now to FIG. 2, shell section 20 is nominally a right circular vertical cylinder having front and back faces 25, 26. As clearly shown, formed intersection 40 between the shell section and bottom section 30 slopes downward from the back face to the front face of the shell section (i.e. left to right in FIG. 2). This produces the extremely beneficial result of the front face of the shell section being vertically longer than the back face.

In the preferred embodiment, formed intersection 40 is neither horizontal nor planar across its circumference, but, instead, may be seen from the side view in FIG. 2 to curve forward and down from the rear to the front of the tank. The increased length of the non-planar, downward sloping formed intersection of the preferred embodiment beneficially reduces the stress in that intersection/joint. Alternatively, the formed intersection may be non-horizontal (i.e. downward sloping from rear to front) and planar, which embodiment could also be called "downward sloping but not curved."

As shown in FIGS. 1 and 2, the outlet aperture 38 and outlet portion 31 of the bottom section are generally vertically aligned with the front face of the shell section. Thus, it may also be said that the outlet portion 31 is generally vertically aligned with the front extremity of the shell 20. In FIGS. 1 and 2, one may see that, in the preferred embodiment, an outlet portion 31 takes the form of a wall that extends slightly from an outlet aperture (38, 39 in FIGS. 3–5) in the front wall of the bottom section. FIGS. 1 and 2 illustrate that the outlet portion wall may be a short horizontal wall forming a ring or neck around the vertical outlet aperture, so that the outlet in its entirety may be considered vertical or approximately vertical.

Another feature of this novel and versatile invention is the shape of the outlet portion. Although depicted in FIGS. 1 and 2 as circular, the shape may also be rectangular, ovular, or any other shape as dictated by the tank's usage and the selected method of opening and closing the outlet portion.

A critical feature in the fabrication of this invented self-emptying tank is the formation of specially-shaped patterns for first and second formed shapes 23, 33. The joining of these formed shapes of the shell and bottom sections produces critically important beneficial features of this invention including:

a downward sloping intersection between shell and bottom sections, reduced stresses in the intersection, increased cylindrical front surface area of the tank just above the outlet portion for enhanced positioning of ancillary devices 70, vertical orientation of the outlet portion, and a plurality of available shapes for the outlet portion.

Figure 3A:
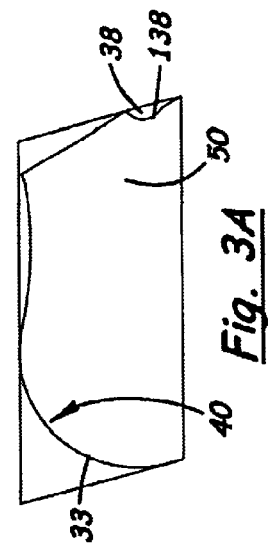
FIGS. 3A and 3B are plan views of one embodiment of shaped patterns for the bottom section (FIG. 3A) and the lower end of the shell (FIG. 3B), wherein these patterns may be used to produce plates forming portions of the preferred embodiment having a circular outlet portion.

The formed shapes of the lower end of the shell section and the upper portion of the bottom section are fabricated from patterns such as those shown in FIGS. 3A and B, and 4A and B, wherein these figures illustrate the patterns for a circular shape 38 for the outlet portion.

Figure 3B:
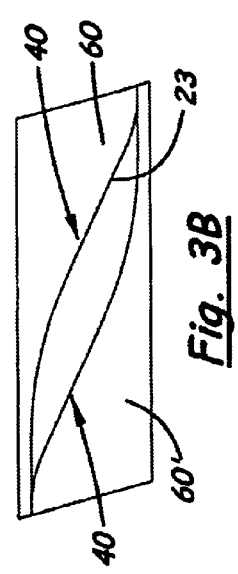
Figure 3C:
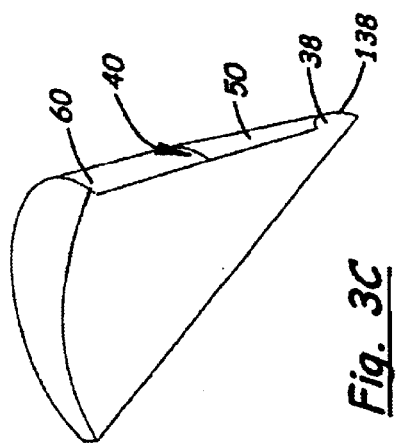
FIG. 3C is an isometric view of a right half of a bottom section and shell lower end combination, from plates cut according to the patterns in FIGS. 3A and 3B, joined at a curved intersection.

In FIG. 3A is shown the pattern for producing one half of the preferred bottom section of the tank, wherein plate 50 may be cut out to result in the right half of the second formed shape 33 and the right half of the circular outlet aperture 38. FIG. 3B shows the pattern for plate 60, which may be cut out to result in the right half of the lower end of the shell, which includes right half of first formed shape 23. One may see that the curved edges (first and second formed shapes 23, 33) in FIGS. 3A and 3B are joined in FIG. 3C to produce formed intersection 40 having a non-planar curve, to create a right half of the bottom section and shell lower end combination. Note that the shape of the curve edge 138 defines the shape of right half of outlet aperture 38. In FIG. 3B, plate 60' is appropriate for the left half of the lower end of the shell.

Figure 4A:
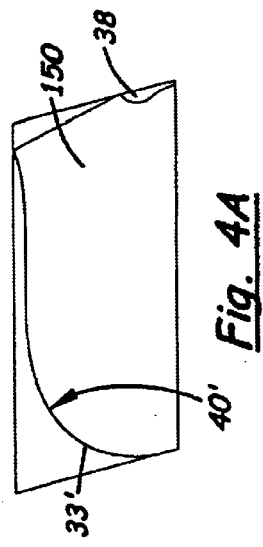
FIGS. 4A and 4B are plan views of alternative embodiments of shaped patterns for the bottom section (FIG. 4A) and the lower end of the shell (FIG. 4B), wherein these patterns may be used to produce plates forming portions of an alternative embodiment having a circular outlet portion.
Figure 4B:
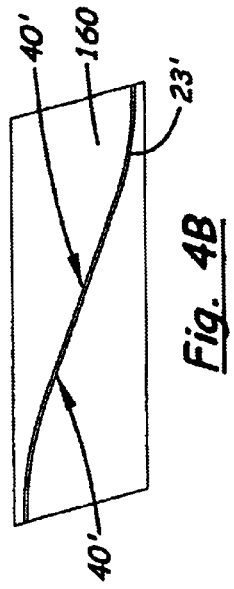
Figure 4C:
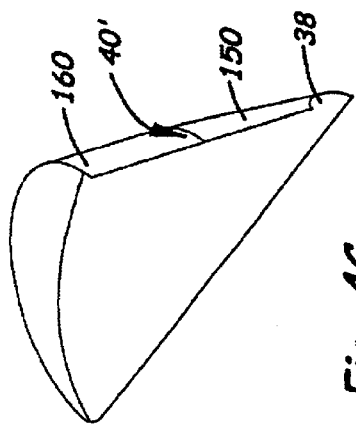
FIG. 4C is an isometric view of a right half of a bottom section and shell lower end, from shapes cut according to the patterns in FIGS. 4A and 4B, joined at a sloping but non-curved intersection.

FIGS. 4A–C show shaped patterns for creating a right half of a bottom section and lower end of the shell, for an alternative embodiment which produces a planar formed intersection 40'. Although the non-planar curve of the preferred embodiment uses slightly more material than the planar approach, it has the benefit of reduced stresses at the intersection. FIG. 4A illustrates the pattern for plate 150, with second formed shape 33'. FIG. 4B illustrates the pattern for plate 160, with first formed shape 23'. When welded or otherwise connected together at formed intersection 40', as in FIG. 4C, these two plates form the right half of the bottom section—lower end combination.

Figure 5C:
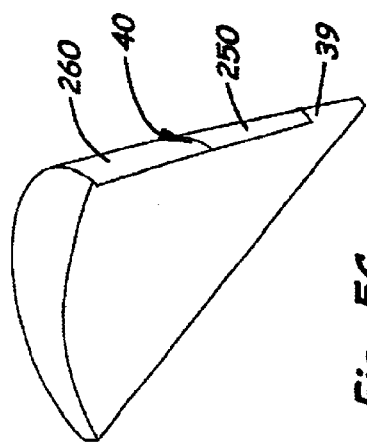
FIG. 5C is an isometric view of a right half of a bottom section and shell lower end, from shapes cut according to the patterns in FIGS. 5A and 5B, joined at a curved intersection.
Figure 5B:
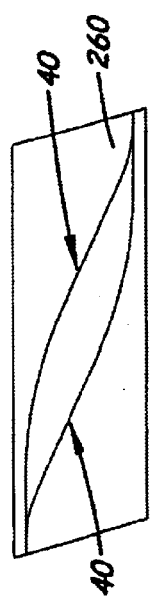
FIGS. 5A and 5B are plan views of another alternative embodiment of shaped patterns for the bottom section (FIG. 5A) and the lower end of the shell (FIG. 5B), wherein these patterns may be used to produce plates forming portions of an alternative embodiment having a rectangular outlet portion.
Figure 5A:
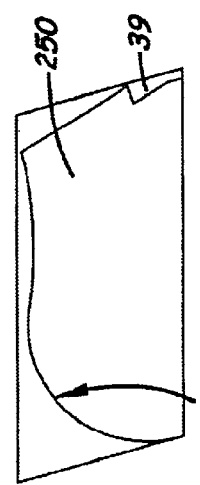

In demonstrating the adaptability of this invention, FIGS. 5A-C show the shaped patterns for the preferred embodiment having a rectangular shape 39 for the outlet aperture. FIG. 5A illustrates the pattern for plate 250, FIG. 5B illustrates the pattern for plate 260, and FIG. 5C illustrates plate 250 and plate 260 joined at formed intersection 40 into the right half of the bottom section—lower end combination, including the right half of the rectangular outlet aperture 39.

It is important to note that none of the preferred shaped patterns of this invention produce bottom sections having a conical configuration nor do the bottom sections have any reference axis such as would be produced by a body of revolution. The bottom sections may be said preferably not to be conical, and the outlet apertures are preferably not formed by cutting across a cone near its vertex.

Although this invention has been described above with reference to particular means, materials and embodiments, it is to be understood that the invention is not limited to these disclosed particulars, but extends instead to all equivalents within the scope of the following claims.

I claim:

1. A self-emptying tank for processing fluids having included solids, said tank comprising:
    a top section having a perimeter,
    a shell section having upper and lower ends, the upper end being fixedly joined to the perimeter of said top section, the lower end having a first formed shape, and
    a bottom section having an outlet portion and an upper portion, the upper portion having a second formed shape, the second formed shape being fixedly and cooperatively joined to the first formed shape of the lower end of said shell section thereby establishing a formed intersection between the shell section and the bottom section,
    wherein said shell section nominally a right circular vertical cylinder having vertically oriented front and back faces, the front face being vertically longer than the back face.

2. A self-emptying tank according to claim 1 wherein the formed intersection between said shell sec on and said bottom section slopes downward from the back face to the front face of said shell section and the outlet portion of said bottom section being vertically aligned with the front face of the shell section.

3. A self-emptying tank according to claim 1 wherein the outlet portion of said bottom section is approximately vertical.

4. A self-emptying tank according to claim 1 wherein the outlet portion of said bottom section has a shape selected from the group consisting of circles, rectangles, and ovals.

5. A self-emptying tank according to claim 1 wherein the outlet portion comprises an outlet aperture that is vertical.

6. A self-emptying tank according to claim 1 wherein the outlet portion comprises an outlet aperture that is vertical and vertically aligned with the front face of the shell section.

7. A method of fabricating a self-emptying tank for processing fluids having included solids, comprising the steps of:
    fabricating a top section having a perimeter,
    fabricating a shell section having a front face, a back face, and upper and lower ends, the upper end being fixedly joined to the perimeter of the top section,
    forming from shaped patterns a first formed shape in the lower end of the shell section,
    fabricating a bottom section having an outlet portion and an upper portion,
    forming from shaped patterns a second formed shape in the upper portion of the bottom section,
    joining the second formed shape of the upper portion of the bottom section to the cooperatively matching first form d shape of the lower end of the shell section thereby establishing a formed intersection between the shell section and the bottom section, and
    sloping the formed intersection downwardly from the back face to the front face of the shell section.

8. A method of fabricating a self-emptying tank according to claim 7 comprising the additional step of vertically aligning the outlet portion with the front face of the shell section.

9. A method of fabricating a self-emptying tank according to claim 7 comprising the additional step of forming from shaped patterns the bottom section such that the outlet portion is approximately vertical.

10. A method of fabricating a self-emptying tank according to claim 7 comprising the additional step of forming from shaped patterns the outlet portion having a shape selected from the group consisting of circles, rectangles, and ovals.

11. A method of fabricating a self-emptying tank according to claim 7 wherein the outlet portion comprises an outlet aperture that is vertical.

12. A method of fabricating a self-emptying tank according to claim 7 wherein the outlet portion comprises an outlet aperture that is vertical and vertically aligned with the front face of the shell section.

\* \* \* \* \*